Dec. 16, 1924.  
W. P. COFFMAN ET AL  
1,519,531  
FRICTION CLUTCH  
Filed July 21, 1921
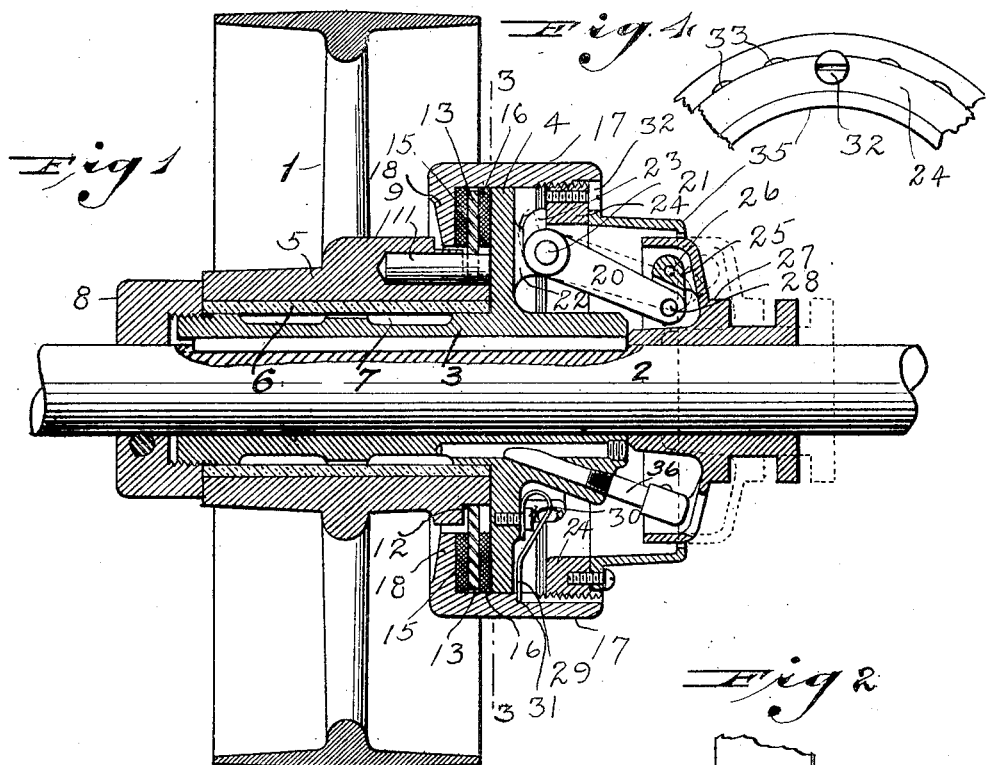
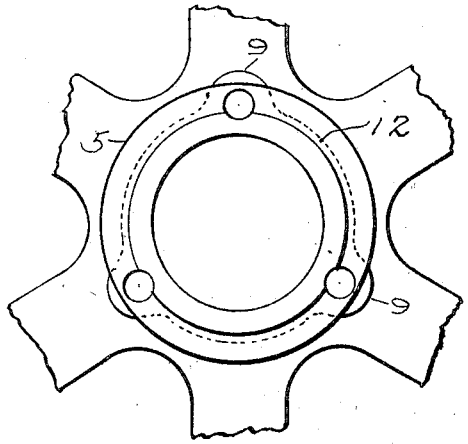
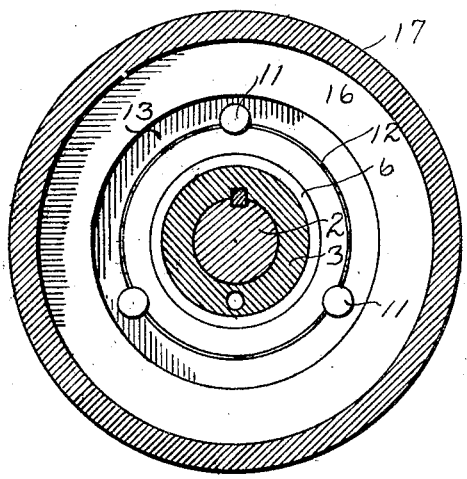
INVENTOR.  
William P. Coffman  
BY Carl M. Anglemyer  
F. L. Walker ATTORNEY.

Patented Dec. 16, 1924.

1,519,531

UNITED STATES PATENT OFFICE.

WILLIAM P. COFFMAN, OF DUNKIRK, AND CARL M. ANGLEMYER, OF DAYTON, OHIO, ASSIGNORS TO THE EDGEMONT MACHINE COMPANY, OF DAYTON, OHIO, A CORPORATION OF OHIO.

FRICTION CLUTCH.

Application filed July 21, 1921. Serial No. 486,515.

*To all whom it may concern:*

Be it known that we, WILLIAM P. COFFMAN, of Dunkirk, in the county of Hardin, State of Ohio, and CARL M. ANGLEMYER, of Dayton, county of Montgomery, State of Ohio, citizens of the United States, have invented certain new and useful Improvements in Friction Clutches, of which the following is a specification.

This invention relates to friction clutches and more particularly to quick acting clutches of the disc or ring type. The invention has been shown in the drawings and will be hereafter described in association with the loose driving pulley, and a driven shaft to which the pulley is to be intermittently connected by the operation of the clutch. It will be obvious, however, that the clutch construction is not limited to such application alone, but may be utilized in other assemblies.

The object of the invention is to simplify the structure as well as the means and mode of operation of such clutch mechanism whereby it will not only be cheapened in construction, but will be more efficient in use, positive in operation, uniform in action, capable of being quickly and easily engaged and disengaged, and unlikely to get out of repair.

A further object of the invention is to provide improved means for quickly and easily adjusting the clutch devices uniformly thruout their circle of operation to compensate for wear or to take up lost motion.

A further object of the invention is to provide improved means for applying the leverage and transmitting the power thereof to the frictionally engaging clutch faces, and to further provide improved means for mounting the engaging elements.

With the above primary and other incidental objects in view as will more fully appear in the specification, the invention consists of the features of construction, the parts and combinations thereof and the mode of operation or their equivalents as hereinafter described and set forth in the claims.

Referring to the drawings, Fig. 1 is a sectional view of the assembled clutch. Fig. 2 is a face view of the driver hub. Fig. 3 is a section on line 3—3 of Fig. 1. Fig. 4 is a detail of the adjusting ring.

Like parts are indicated by similar characters of reference throughout the several views.

Referring to the drawings, 1 is the normally loose running driving pulley and 2 the shaft to be driven. Securely mounted upon the shaft 2 by being keyed or otherwise secured thereon is a driven element comprising the sleeve 3, carrying the peripheral flange 4. The driver which in this instance is represented by the hub 5 of the pulley is journalled upon the lateral extension of the sleeve 3, in proximity to the peripheral flange 4. The hub 5 is shown provided with a bronze bushing 6 while the sleeve 3 is recessed to afford a lubricant reservoir 7. The bushing 6 is pressed upon the sleeve 3 while the hub 5 rotates upon the bushing. The hub 5 is secured upon the bearing sleeve by means of a retaining collar 8, screw threaded upon the extremity of the sleeve 3. It is thus held for revoluble movement about the sleeve in proximity to the flange 4. The hub 5 is provided adjacent to the flange 4 with a plurality of peripheral bosses 9, which are drilled parallel with the axis of rotation to receive hardened steel studs or pins 11. After having been drilled for the reception of the studs 11, the rabbet or shoulder 12 is turned in the face of the hub 5 adjacent to the flange 4, thereby exposing the ends of the inserted studs or pins 11 to substantially half their thickness and enabling such studs or pins to be utilized as keys for engagement of a clutch ring 13. The clutch ring 13 is of hardened steel or other suitable material, and has an internal diameter substantially corresponding with the shoulder 12, of the hub 5 upon which it is capable of a sliding movement in an axial direction. The interior circumference of the friction ring 13 is provided with spaced notches, or recesses which engage over the exposed portions of the studs 11 within the peripheral recess 12.

Located on opposite sides of the friction ring 13 are additional clutch rings or friction members 15 and 16. These rings 15 and 16 have an external diameter substantially the equivalent to that of the ring 13 while their internal circumference is somewhat greater than that of the ring 13 whereby they extend entirely free of the hub 5. Thus the driving ring 13 overlaps the rings 15 and 16 inwardly as is shown in Fig. 3.

Surrounding and enclosing the several clutch rings 13, 15 and 16 is an annular internally flanged collar 17, the internal flange 18 of which extends parallel with and adjacent to the friction clutch ring 15, whereby the rings 13, 15 and 16 are interposed between the internal flange 18 of the collar 17 on one side, and the peripheral flange 4 of the driven member 3 upon the other side. The collar 17 with its internal flange 18, is free for axial movement in relation with both the driving and driven members. It is obvious that upon axial movement of the collar 17 toward the right in Fig. 1, the friction rings 13, 15 and 16 will be securely clamped one against the other and intermediate the internal flange 18 and peripheral flange 4. Upon the return movement of the collar 17 axially toward the left, the pressure of the internal flange 18 upon the clutch rings 13, 15 and 16 will be relaxed and the driver 5 with its engaged ring 13 may rotate independently of the rings 15 and 16, and independently of the driven member 3 with its peripheral flange 4.

To actuate the collar 17 to effect the frictional engagement of the clutch ring there are provided a series of toggle levers arranged in different radial positions about the structure. One member 20 of each toggle lever is pivoted at 21 to suitable lugs or ears 22 projecting from the exterior face of the flange 4 of the driven member. Such member 20 is provided with a shoulder or short arm 23, which engages a bearing ring 24 adjustably screw threaded within the movable collar 17. The other member 25 of each toggle is comparatively short and is pivoted at 26 to a shift collar 27, slidingly mounted upon the shaft 2. The members 20 and 25 are interpivoted one to the other at 28. It will be obvious that upon the movement of the shift collar outwardly as indicated by dotted lines in Fig. 1, the tendency will be to straighten the toggle members 20 and 25 in relation one with the other, thereby relaxing the pressure of the short arms or shoulders 23 upon the bearing ring 24. Upon such release of pressure, a series of spring fingers 29 carried by the flange 4 in different radial spaced positions, tend to shift the movable collar 17 axially toward the left in Fig. 1, thereby releasing the frictional engagement of the ring. Any kind of release spring may be employed. The construction shown comprising the spring fingers 29 attached to the peripheral flange 4 by bolts 30 and bearing at their outer ends upon shoulders 31 formed within the collar 17 affords a simple economical but efficient construction.

As the shift collar 27 is moved toward the left in Fig. 1 the arm 20 of the toggle is forced inwardly, as shown by solid lines causing the shoulder 23 to engage the bearing ring 24, forcibly to draw the flange 18 against the clutch rings 13, 15 and 16, to clamp the rings in driving relation. The construction is preferably such that the shift collar 27 may be moved inwardly to such position as to throw the arm 25 slightly beyond a dead center position, thereby locking the clutch parts in operated relation.

In order to compensate for wear of parts, and to adjust the mechanism to the desired range of movement, in the assembly, the bearing ring 24 is screw threaded within the collar 17 and by its rotation may be adjusted inwardly or outwardly to vary the throw of the levers 20 and arms or shoulders 23, necessary to draw the parts into operative engagement. As a simple economical and efficient means of locking this bearing ring in various positions of adjustment, there has been provided a screw 32, inserted within the bearing ring 24, the shouldered head of which overhangs the lateral face of the ring 17. The screw 32 is counter sunk in the ring 24 and in the adjacent portion of the collar 17. The collar is provided with a series of depressions or notches 33, which in different positions of revoluble adjustment of the bearing ring 24 are complementary to the counter sink in the ring 24 for the head of the screw 32. By withdrawing the screw 32 until its shouldered head clears the face of the collar 17, the bearing ring may be rotated and the screw brought into registry with one of the notches 33 in the collar 17, and thereafter reseating the screw 32 so that its shouldered head will engage in such registered notch. A shield ring 35 is attached to the bearing ring 24 to complete the enclosure of the operating parts. A lubricating passage is provided at 36 for supplying lubricant to the reservoir 7.

It is to be noted that the collar 17 is capable of axial movement wholly independent of both driving and driven members, as are also the friction rings 15 and 16. The driving ring 13 has positive connection with the driver 5, and the driving contact is effected not thru the movable ring 17, but thru the ring 16 clamped between the driving ring 13 and the peripheral flange 4. The movable ring 17 is not a driving element but is merely a clamping device. The interposed friction ring 15 insures the rotation of the ring 17 with the driving and driven elements when in their set or operative position.

While the hub 5 has been designated as the driver and the flanged sleeve 3 as the driven member, it is obvious that this direction of power transmission may be reversed and the shaft 2 may be made the power shaft, and the pulley the driven member. Likewise in lieu of the pulley arms and rim, other structures may be mounted upon the hub 5, or connected therewith for operative engagement, thru the clutch mechanism described, with the shaft 2.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. In a friction clutch, a driving and a driven member, one of said members having a series of studs embedded therein, a peripheral recess formed in said member within which the studs are exposed, a clutch ring, having a series of notches in its inner circumference engaging over the exposed portions of said studs and movable in an axial direction thereon, a clutch face on the other of said members, friction means interposed between said ring and clutch face, and clamp means for shifting said ring axially and clamping it in frictional engagement with the said clutch face to interconnect the driving and driven members.

2. In a friction clutch, two relatively rotatable members to be interengaged, an abutment upon one of the members, a movable ring carried by the other member and axially movable thereon, a peripheral recess in said other member in which said ring is seated for axial adjustment, a series of studs embedded in said member and intersecting said peripheral recess, said ring having a series of notches in its inner circumference within which the studs engage to afford rotary driving engagement independent of the lateral adjustment of the ring, and means to clamp said ring in frictional engagement with said abutment.

3. A clutch for coupling and uncoupling two rotary elements, one of said elements having formed therein a peripheral offset, an intermediate clutch ring mounted for axial adjustment upon the peripheral offset, a cylindrical stud partially embedded in the peripheral face of said offset in substantially parallel relation with the axis of rotation, with a portion of the cylindrical face of the stud projecting beyond the peripheral face of the offset, the intermediate clutch ring being internally notched for engagement over the exposed portion of said stud, two gripping members adapted to engage opposite sides of the intermediate member and carried by the other of said elements and means for actuating the gripping members to clamp and release the intermediate member.

4. In a friction clutch of the character described, a sleeve to be secured upon a shaft for rotation therewith, a peripheral flange carried by said sleeve, a pulley journaled upon said sleeve in juxtaposition to said flange for independent rotation, an internally flanged ring surrounding the peripheral flange carried by the sleeve with the internal flange of said ring overhanging the hub of said pulley in spaced relation with the sleeve flange, a flat ring located intermediate the sleeve flange and ring flange and having sliding engagement with the hub of said pulley in an axial direction, but engaged for rotation with said pulley, friction surfaces for engaging the said flat ring with the sleeve flange and ring flange for rotation in unison therewith, a cylindrical stud partially embedded in the peripheral face of said hub in substantially parallel relation with the axis of rotation with a portion of the cylindrical face of the stud projecting beyond the peripheral face of the hub, the intermediate clutch ring being internally notched for engagement over the exposed portion of said stud, and means to effect an axial movement of the internally flanged ring in relation to the sleeve flange and pulley whereby the sleeve and ring flanges and interposed flat ring are frictionally interengaged with each other.

5. In a friction clutch, two relatively rotatable members to be interconnected, a fixed peripheral flange carried by one of said members, a series of studs embedded in an axial direction in the other member in proximity to said fixed flange, said member having a peripheral recess formed therein, which is intersected by said studs, a friction ring seated in said recess for axial movement to and from the fixed flange of the other member, said ring having a series of notches in its inner circumference straddling the portions of the studs exposed in said peripheral recess, a clamp collar concentrically positioned about the fixed flange and the friction ring and axially movable independent thereof and of both of the members to be engaged, an internal flange upon said clamp collar overhanging the friction ring, an adjustable bearing ring mounted within the clamp collar, on the side of the fixed flange opposite the friction ring, a plurality of operating levers pivotally mounted upon the fixed flange and operatively engaging the adjustable bearing ring to actuate the clamp collar axially and draw the friction ring into operative connection with the fixed flange, and means to adjust said bearing ring.

6. In a friction clutch of the character described, a sleeve to be secured upon a shaft for rotation therewith, a peripheral flange carried by said sleeve, a pulley journaled upon said sleeve in juxtaposition to said flange for independent rotation, an internally flanged ring surrounding the peripheral flange carried by the sleeve with the internal flange of said ring overhanging the hub of said pulley in spaced relation with the sleeve flange, a flat ring located intermediate the sleeve flange and ring flange and having sliding engagement with the hub of said pulley in an axial direction, but engaged for rotation with said pulley, friction surfaces for engaging the said flat ring with the sleeve flange and ring flange for rotation in unison therewith, rock levers pivotally mounted upon the sleeve flange, a bearing ring adjustably mounted within the internally flanged ring and in spaced relation with the sleeve flange, said bearing ring being engaged by the rock levers upon oscillation thereof to effect an axial movement of the internally flanged ring in relation with the sleeve flange and pulley whereby the sleeve and ring flanges and interposed flat ring are frictionally interengaged with each other and means for rocking the levers.

In testimony whereof, we have hereunto set our hands this 15th day of July A. D. 1921.

WILLIAM P. COFFMAN.
CARL M. ANGLEMYER.

Witnesses:
WILLIAM A. SWANEY,
GEORGE C. HELWIG.